UNITED STATES PATENT OFFICE.

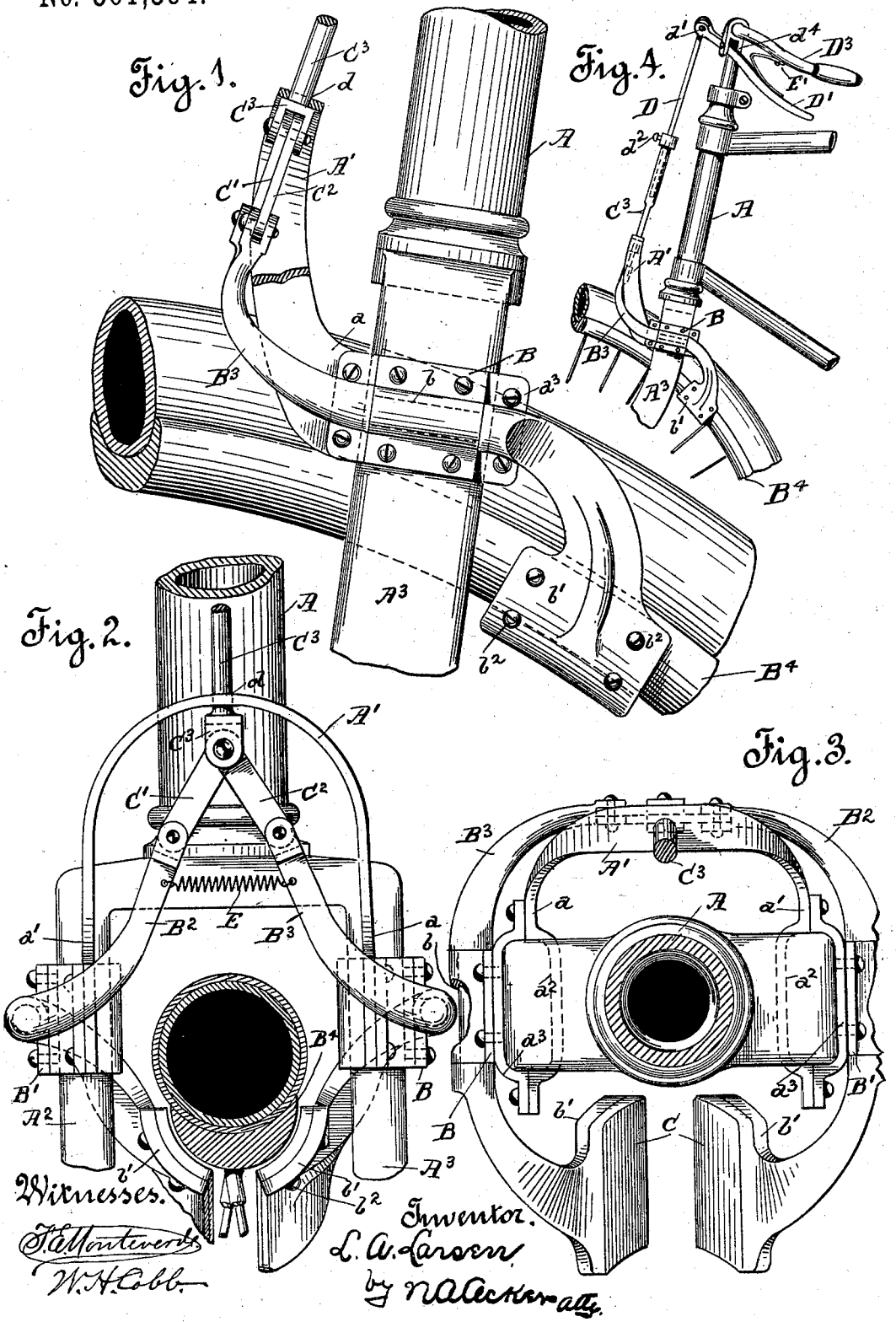

LOUIS A. LARSEN, OF SAN FRANCISCO, CALIFORNIA.

BICYCLE-BRAKE.

SPECIFICATION forming part of Letters Patent No. 561,594, dated June 9, 1896.

Application filed August 12, 1895. Serial No. 558,959. (No model.)

*To all whom it may concern:*

Be it known that I, LOUIS A. LARSEN, a citizen of the United States, residing at San Francisco, in the county of San Francisco and State of California, have invented certain new and useful Improvements in Bicycle-Brakes; and I do hereby declare that the following is a full, clear, and exact description thereof.

This invention relates to a certain new and useful improvement in bicycle-brakes; and it consists in the arrangement of parts and details of construction, as will be hereinafter set forth in the drawings and described and pointed out in the specification.

The object of my invention is to provide a brake mechanism so designed as to apply the brake-shoes directly to the sides of the rim of the bicycle-wheel, so as to prevent frictional wear upon the tire proper of the wheel, thus overcoming the objection now existing among wheelmen to the use of the wheel-brake, wherein the brake-shoes are forced against the surface of the rubber or pneumatic tire, the objection being that the tire quickly wears away by applying the brake-shoes directly to the surface of the pneumatic tire. Owing to the expense of the tires used upon the bicycles now in general use, the majority of the riders prefer to dispense with the ordinary wheel-brake rather than cause unnecessary wear to the tire of the wheel. By providing a bicycle-brake which will brake against the rim of the wheel this objection to the use of wheel-brakes is overcome.

In order fully to understand my invention, reference must be had to the accompanying sheet of drawings, wherein—

Figure 1 is an enlarged detail broken view, in side elevation, showing a portion of the bicycle fork and head, a portion of the wheel-rim and tire, and a portion of the brake mechanism. Fig. 2 is a front view in elevation of the mechanism disclosed by Fig. 1. Fig. 3 is a top plan view of the mechanism illustrated by Fig. 1 with the wheel or rim and tire removed; and Fig. 4 is a detail view, in side elevation, showing a portion of a bicycle with my brake mechanism applied thereto.

In front of the bicycle-head A, I locate the curved brace-plate A', the rearwardly-extending arms $a\ a'$ of which are depressed at their outer end, so as to form a seat $a^2$, which receives the under or inner face of the arms $A^2\ A^3$ of the bicycle-fork, said arms of the curved brace-plate being securely fastened to the arms $A^2\ A^3$ by means of the curved plates $a^3$, which are bolted to the arms $a\ a'$, Figs. 2 and 3.

To the plates $a^3$ I bolt or otherwise secure the bearing-plates B B', which bearing-plates secure in place the brake-levers $B^2\ B^3$. The brake-levers are free to turn or oscillate within the seat, groove, or channel $b$, formed in the said bearing-plates. As will be observed by reference to Fig. 1, the rear or inner end of the brake-levers I curve downward and provide with the enlarged head $b'$, which head is shaped so as to conform to the contour of the outer face of the rim $B^4$ of the bicycle-wheel. To the inner face of the enlarged head $b'$ of each brake-lever is fastened, by means of the bolts $b^2$ or otherwise, the brake-shoe C, which shoe is preferably composed of leather, although other material suitable for the purpose may be made use of.

The forward or outer end portion of each brake-lever is curved upward, Figs. 1 and 2, and the end of lever $B^2$ is connected to the lower end of toggle-lever C', and the end of lever $B^3$ is connected to toggle-lever $C^2$, the upper end of each toggle-lever being secured to the lower end of the female section $C^3$ of the vertically-movable brake-rod. This female section of the vertically-movable brake-rod extends through a guide opening or slot $d$, cut through the top of the curved brace-plate A'. Within the hollow female section $C^3$ fits the lower end portion of the male section D of the vertically-movable brake-rod, which section is held in place by the set-screw $d^2$. By thus connecting the sections of the vertically-movable brake-rod the same may be readily lengthened or shortened as the bicycle-head is raised or lowered.

The upper end of the male section D of the vertically-movable brake-rod is connected by pin $d'$ between the bifurcated end of the hand-lever D', which lever is fulcrumed to the bracket $d^4$, projecting from the handle-bar $D^3$ of the bicycle, Fig. 4.

The forward or outer end of the brake-levers is not only curved upward, but is also curved or bent inward toward the toggle-joint levers C' C², Figs. 2 and 3. Consequently as the toggle-joint levers are straightened outward by the downward movement of the vertically-movable brake-rod the forward end of the brake-levers B² B³ is thrown outward, causing the brake-levers to oscillate in their bearing-plate and the lower or inner end to move inward or toward the rim of the bicycle.

My brake mechanism is operated in the following manner: In order to apply the brake-shoes to the rim of the wheel, the rider of the bicycle presses upward upon the free end of the fulcrumed hand-lever, which forces the outer end thereof downward. As the outer end of the fulcrumed hand-lever is moved downward the vertically-movable brake-rod is carried therewith, the downward movement of which causes the toggle-joint levers to move apart or straighten out. The straightening out of the toggle-joint levers forces over or outward the forward end of the curved brake-levers and causes the said levers to oscillate within the bearing-plates and throwing the lower end of the brake-levers carrying the brake-shoes inward or against the surface of the wheel-rim. Inasmuch as connection is made between the vertically-movable brake-rod and the brake-levers by means of the toggle-joint levers, it is obvious that I am enabled to secure considerable brake-pressure with the least amount of power applied to the fulcrumed hand-lever. As power is removed from the fulcrumed hand-lever the movement of the brake mechanism is the reverse of that just described. The forward end of the brake-levers B² B³, I connect by means of the spring E, which spring tends to draw the forward ends of the said levers together and maintain the lower end carrying the brake-shoes away from or clear of the rim of the bicycle-wheel. I also interpose the spring E' between the fulcrumed hand-lever and the handle-bar of the bicycle, so as to insure the downward movement of the free end of the said lever when pressure is removed therefrom.

Having thus described my invention, what I claim as new, and desire to secure protection in by Letters Patent, is—

1. In a bicycle-wheel brake, the combination with the curved brace-rod secured to and projecting in advance of the arms of the bicycle-fork, the brake-levers secured within bearing-plates attached to the fastening-plates of the curved brace-rod, the brake-shoes secured to the lower end of the brake-levers which engage the rim of the bicycle-wheel when the lower end of the brake-levers are thrown inward or toward the wheel, of the vertically-movable brake-rod working through a guide-slot in the curved brace-rod, the fulcrumed hand-lever for raising and lowering the vertically-movable brake-rod, and of the toggle-joint connection between said brake-rod and the forward end of the brake-levers.

2. In a bicycle-wheel brake mechanism, the combination with the vertically-movable brake-rod connected with a pair of brake-levers which it throws toward or from the rim of the bicycle-wheel as raised and lowered, of the curved brace-rod secured to and extending in advance of the arms of the bicycle-fork, said curved brace-rod acting as a guide for the vertically-movable brake-rod.

In testimony whereof I affix my signature, in presence of two witnesses, this 2d day of August, 1895.

LOUIS A. LARSEN.

Witnesses:
 N. A. ACKER,
 DANIEL HANLON.